Aug. 30, 1932.                R. RODERWALD                1,874,628
                              CONNECTER FOR BELTS
                           Filed Dec. 6, 1930        2 Sheets-Sheet 1
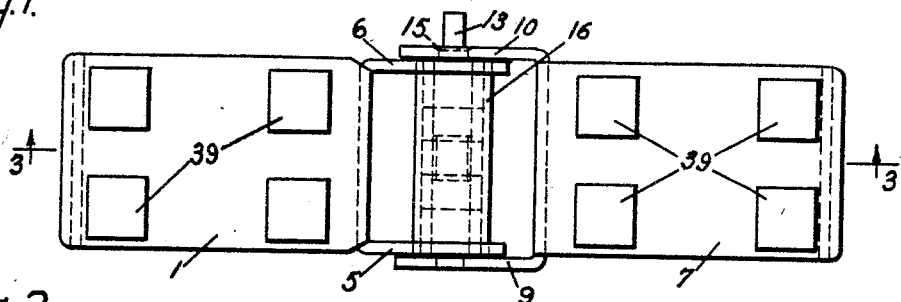
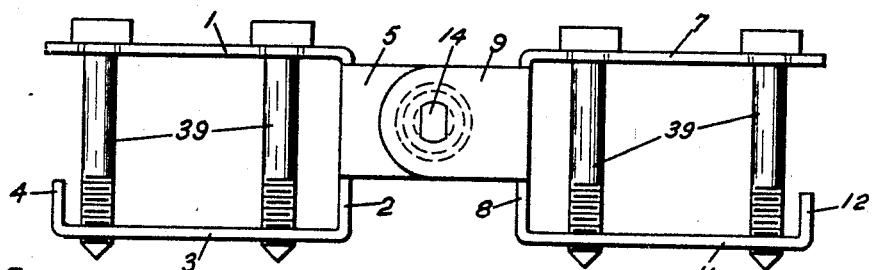
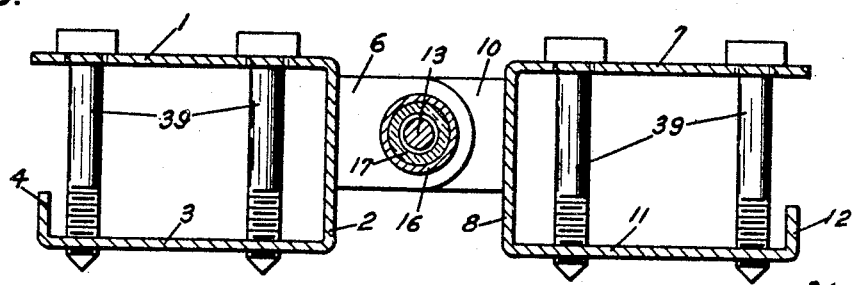
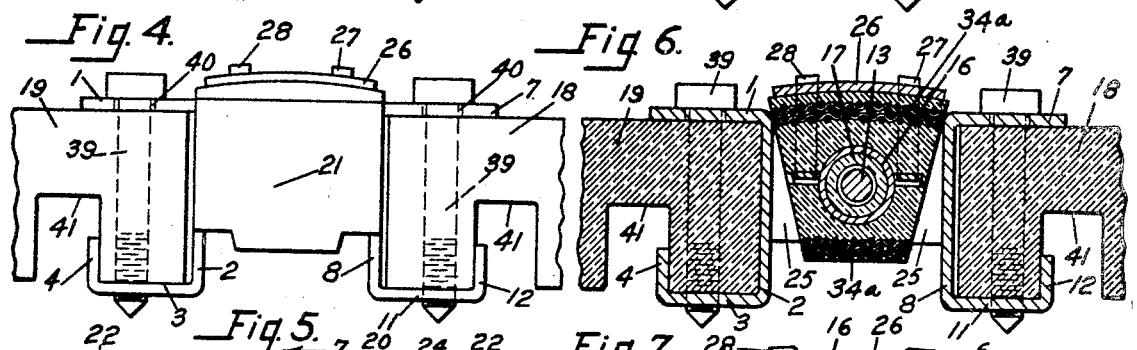
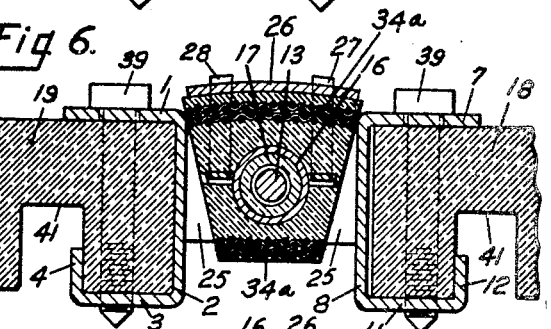
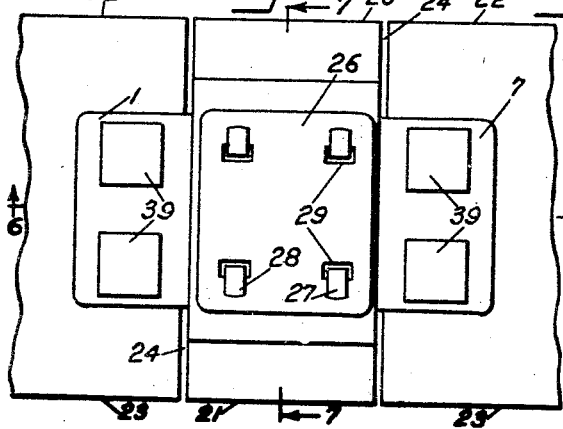
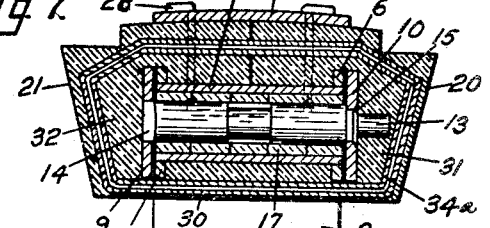
INVENTOR
RUDOLF RODERWALD.
BY
ATTORNEY Aug. 30, 1932.                R. RODERWALD                1,874,628
                            CONNECTER FOR BELTS
                            Filed Dec. 6, 1930          2 Sheets-Sheet 2
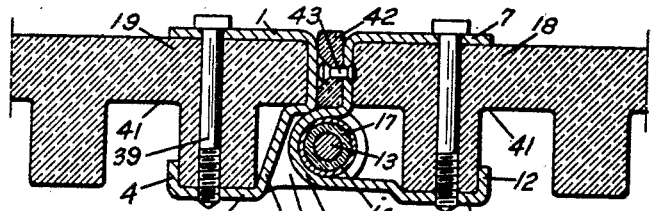
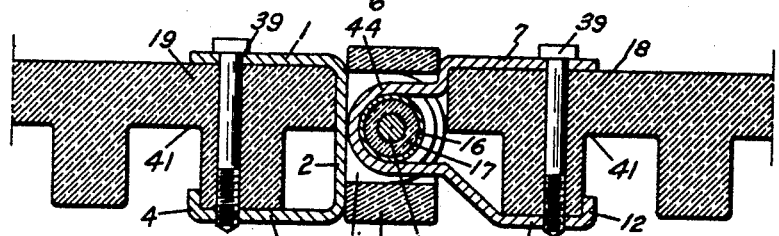
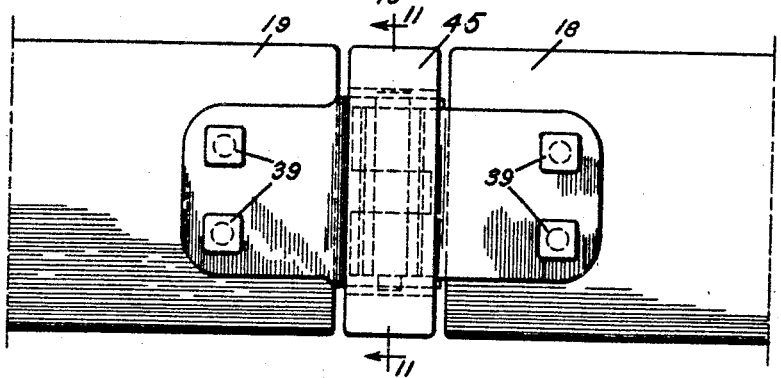
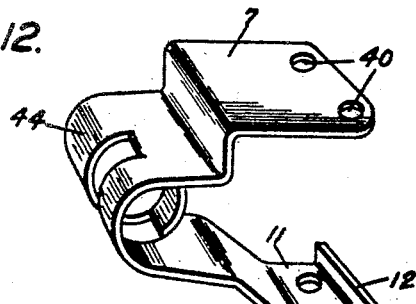
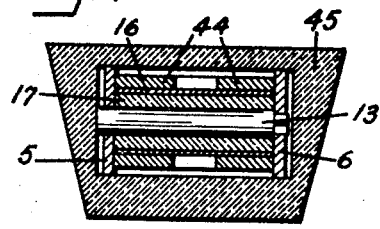
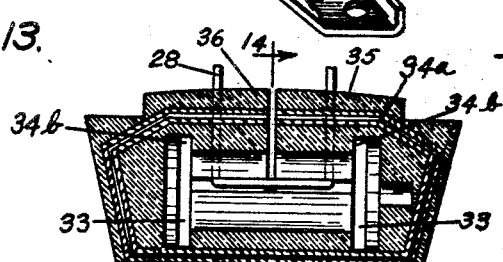
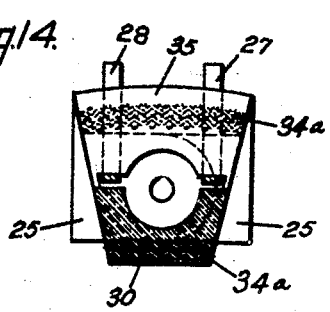
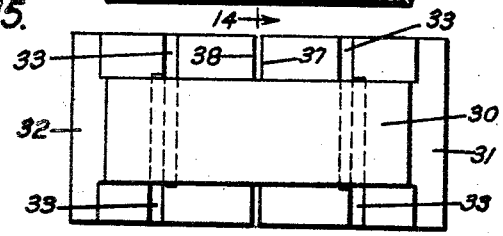
INVENTOR
*RUDOLF RODERWALD.*
BY
ATTORNEY Patented Aug. 30, 1932

1,874,628

UNITED STATES PATENT OFFICE

RUDOLF RODERWALD, OF BERLIN, GERMANY, ASSIGNOR TO THE DAYTON RODER-WALD COMPANY, OF DAYTON, OHIO, A CORPORATION OF OHIO

CONNECTER FOR BELTS

Application filed December 6, 1930. Serial No. 500,548.

My invention relates to connecters for belts.

It is the object of my invention to provide a secure connecter that can be readily attached and detached to the free ends of a belt and which will at the same time so ride with the belt as an integral part thereof that there will be no slipping of the metallic parts of the connecter with the pulley in which the belt is travelling.

It is my object to provide a connecter which not only connects the free ends of the belt but also carries a belt section of the same general form and character as the belt itself so that the junction of the free ends of the belt become substantially of the same structure, and same operation as the belt itself, while at the same time ready means of attaching and detaching the free ends of the belt are provided.

Referring to the drawings:

Figure 1 is a top plan view of the metallic parts of the connecter assembly.

Figure 2 is a side elevation thereof.

Figure 3 is a section on the line 3—3 of Figure 1.

Figure 4 is a side elevation of the complete connecter and of the respective ends of the belt as they are connected together by the connecter.

Figure 5 is a top plan view thereof.

Figure 6 is a section on the line 6—6 thereof.

Figure 7 is a section on the line 7—7 of Figure 5.

Figure 8 is a section through a modified form of the connecter.

Figure 9 is a section through another modified form of the connecter.

Figure 10 is a plan view of Figure 9.

Figure 11 is a section on the line 11—11 of Figure 10.

Figure 12 is a perspective of one of the metallic halves of the connecter hinge.

Figure 13 is an elevation of one of the inside faces or ends of the rubber block in the form that it is premolded, showing it in assembled condition with the hinge.

Figure 14 is a section on the line 14—14 of Figure 13 looking in the direction of the arrows.

Figure 15 is a bottom view of the filler block.

Referring to the drawings in detail, it will be noted that this hinge comprises a pair of belt clamping members forming the straps of a hinge which are pivoted on a pintle pin. This connecter between the two clamping straps of the hinge carries a block of the same general character and configuration as that of the belt so that the metallic portions of the hinge do not engage with the pulley and so that the belt is substantially continuous. Thus the metallic parts never touch the pulley and the driving effect of the belt is not lessened in any perceptible degree because the hinge space of the connecter is filled with a section of belt material corresponding to the main belt.

The belt clamp consists of a U-shaped plate formed of an upper plate 1, a vertical plate 2, also a horizontal plate 3, and an upwardly extending ear 4. The vertical portion 2 of this plate has a pair of horizontally extending vertically arranged ears 5 and 6. The other of the clamping members is likewise provided with an upper horizontal plate that engages the upper surface of the belt, such plate being designated 7, a vertical portion 8 having spaced ears 9 and 10, and a lower horizontal portion 11 with an upturned ear 12. The ears 5, 6, 9 and 10 are joined together by a pintle pin 13 which has a square head 14 inserted in a square slot on the ear 9. At the other end of the pintle pin is formed a shoulder 15, which engages with the ear 10. Between the ears 5 and 6 is rigidly mounted a steel sleeve 16. Within the sleeve and between the sleeve and the pintle pin 13 are rawhide bearing sleeves 17.

Around this connecter is mounted a rubber block or a block of combined rubber and fabric which is trapezoidal in section and of the same section transversely as the ends of the belt 18 and 19. Thus the side walls 20 and 21 of this block are in alignment with the side walls 22 and 23 of the main belt. There is a slight space 24 between the ends of the belt and the ends of the filler block. The ends of the filler block are recessed as at 25 to receive the vertical portions 2 and 8 of the hinge clamps.

The block may be either molded around the ears and then vulcanized, or may be preformed and then clamped into position. When so pre-formed and clamped, the block is formed so as to be sprung apart along its lines of division until it engages the hinge and the hinge straps. Then the metal fingers imbedded in the filler block are inserted through apertures in the block and the free ends of these fingers are turned over upon the metal clamping plate. The clamping plate is designated 26 and the free ends of such fingers which hold together the faces of the block are designated 27 and 28. They project upward through slots 29 in the clamping plate 26.

In Figures 6, 7, 13, 14 and 15 applicant's filler block is shown. This filler block is composed of one piece of rubber, suitably formed to inclose the pivotal connection between the ears 5 and 6 on one hand, and 9 and 10 on the other hand, and the pintle pin 13 uniting these ears. In order that this filler block may be placed over the ears and the pin the upper part is split.

The lower part or bottom of the filler block is indicated by the numeral 30 and has on one end an end wall 31 and on the other end an end wall 32, both integral with the bottom. Extending inwardly from one end wall is a top portion 35 and extending inwardly from the other end wall is a top portion 36. The top portions 35 and 36 are parallel to and similar to the bottom portion 30, with the exception that they are separate one from the other so that the filler block may be slipped over the ears and the pintle pin.

The interior of the filler block is hollow to provide space for the pintle pin and the ears. The ears fit in slots 33 and 34', one of these slots being adjacent each end of the filler block. Extending around the filler block, as clearly shown in Figure 7, is a layer of fabric 34a used for the purpose of giving strength and rigidity to the rubber constituting the bottom, ends and top portions of the filler block. The faces of the top portions abutting each other are indicated by the numerals 37 and 38. In order to hold the top portions 35 and 36 together after the filler block has been placed around the ear members and the pintle pin, a plate 26 is provided. For holding this plate 26 in place fingers 27 and 28 extend through the top portions and through slots in the plate 26, and are bent over on top thereof so it is held in position.

It will be noted that in some cases this filler block is formed in its approximate shape in position on the hinge, the hinge is attached to the vulcanized belt members which are likewise formed in their approximate shape and condition and then the entire structure connected as the belt is vulcanized in a suitable mold of trapezoidal section.

The hinge clamps are attached to the notched belt members 18 and 19 by passing the bolts 39 through the apertures 40 in the upper plates 1 and 7, through the ends of the belt at 18 and 19, and then the bolts 39 are threaded through the lower plate members 3 and 11 with the ears 4 and 12 extending into the notch 41 that is formed on the inside of the belt as will be seen in the ends 18 and 19.

Thus the connecter hinge is flexed at its face over the pulley, but it will not engage the pulley as the filler block will engage the sides of the groove of the pulley with its faces 20 and 21.

In the modifications shown in Figures 8 to 12, inclusive, the same general appearance is preserved with some modification of the structure.

As will be seen in Figure 8, a transverse rubber or rubber and fabric plate is mounted on one of the hinge members. Such plate is designated 42 and is retained on one of the hinge members by the rivets 43. The hinge clamps thus are formed with inter-locking loops 44, in which are mounted the pintle sleeve 16, the rawhide fillers 17, and the pintle pin 13. In the form shown in Figure 9 where the axis of the pin is arranged at a higher point, substantially midway of the depth of the belt, the filler block may completely encircle the hinge connection; such block is designated 45.

The forms shown in Figures 10 and 11 employ the particular form of modified hinge clamp shown in Figure 12, but otherwise the parts are as indicated heretofore.

I desire to comprehend within my invention such modifications as may be clearly embraced within the claims and the scope of my invention.

Having thus fully described my invention, what I claim is new and desire to secure by Letters Patent, is:

1. In combination, a pair of clamps pivoted together for supporting the free ends of belts, and a filler block mounted on the pivot of said clamps of the same lateral dimension as the belt.

2. In combination, a belt of resilient material, a clamp engaging each of the spaced ends of said belt, an ear on each clamp pivoted directly to the ear on the other clamp, and a filler block carried by said clamps extending transversely between said clamps and the ends of said belt whereby said filler block is carried on the clamps between the ends of the belt adapted to substantially fill the space between the ends of the belt.

3. In combination, a belt of resilient material, a clamp engaging each of the spaced ends of said belt, a pair of ears on each clamp pivoted directly to the ears on the other clamp, and a filler block carried by the ears extending transversely between said clamps and between the ends of said belt, said belt extending laterally of said clamps.

4. In combination, a belt of resilient material, a clamp engaging each of the spaced ends of said belt, a pair of ears on each clamp, a pivot pin through all the ears, and a filler block carried on said pin extending transversely between said clamps and between the ends of said belt, said belt extending laterally of said clamps, and the filler block extending laterally to the same extent as the belt.

5. In combination, a V-shaped belt having free ends, clamps for clamping said ends, means on each clamp pivoted directly to each other for hinging said clamps to each other in spaced relationship, and a filler block on said means having the same cross section as said belt mounted between said clamps and having its end walls parallel with the side walls of said belt.

6. In combination, a V-shaped belt having free ends, clamps for clamping said ends, spaced means integral with each clamp and pivoted together for hinging said clamps to each other in spaced relationship, and a filler block on the spaced means having the same cross section as said belt mounted between said clamps and having its end walls parallel with the side walls of said belt, said filler block being of yielding material like the belt.

7. In combination, a V-shaped belt having free ends, clamps for clamping said ends, spaced means integral with each clamp and pivoted together for hinging said clamps to each other in spaced relationship, and a filler block on the spaced means having the same cross section as said belt mounted between said clamps and having its end walls parallel with the side walls of said belt, said filler block being of yielding material like the belt, and said belt and filler block extending laterally of the hinged clamps and the pivotal connection therebetween whereby the belt and filler block only engage a pulley upon which the belt is mounted.

8. In combination, a belt connecter comprising a pair of pivoted hinged clamps, means on said clamps for compressibly engaging the free ends of the belt, means on said clamps for engaging in recesses in said belt, said hinged clamps including interlocking means for pivoting said clamps one on the other between said clamps to maintain them in spaced relationship, and a filler block mounted on said interlocking means laterally coextensive with the belt ends.

9. In combination, a belt connecter comprising a pair of pivoted hinged clamps, means on said clamps for compressibly engaging the free ends of the belt, means on said clamps for fitting in recesses in said belt, said hinged clamps including interlocking means for pivoting said clamps one on the other between said clamps to maintain them in spaced relationship, and a filler block mounted on said interlocking means laterally coextensive with the belt ends, and means to detachably clamp said filler block on said clamps.

10. In combination, a resilient belt of trapezoidal section having spaced adjacent ends, a connecter therefor comprising hinged clamping means for engaging the free ends of the belt, and a filler block mounted on said hinged clamping means adapted to permit the movement of the said clamping means and to engage the side walls of the supporting pulley coextensive with the side walls of the belt, and means to space laterally the coengaging parts of the clamping means and to maintain in alignment said hinged clamping means.

11. In combination, a belt having spaced adjacent ends, hinged clamps pivoted on one another engaging said respective ends, said hinged clamps including a transverse pivot between said ends connecting said clamps, and a filler block mounted on said transverse pivot whose longitudinal and transverse sections are trapezoidal.

12. In combination, a belt having spaced adjacent ends, hinged clamps pivoted on one another engaging said respective ends, said hinged clamps including a transverse pivot between said ends connecting said clamps, and a filler block mounted on said hinged clamps whose longitudinal and transverse sections are trapezoidal, said filler block adapted to overlap the ends of said hinged clamps and to completely surround said ends.

13. In combination, a belt having free spaced adjacent ends of trapezoidal section, hinged clamps mounted on the free ends, said hinged clamps including means to pivot said clamps one on the other comprising overlapping ears and a pintle pin, and a split resilient member adapted to enclose said ears and the pintle pin and extend therebeyond laterally.

14. In combination, a belt having free spaced adjacent ends of trapezoidal section, hinged clamps mounted on the free ends, said hinged clamps including means to pivot said clamps one on the other comprising overlapping ears and a pintle pin, and a split resilient member adapted to enclose said ears and the pintle pin and extend therebeyond laterally, and means to retain said split resilient member in position comprising a clamping plate mounted thereon and clamping members extending therethrough and carried by said split resilient member.

15. In combination, a pair of spaced clamps having ears, means for pivoting said ears together, bolts passing through said clamps and belt ends carried thereby, said bolts having threads thereon adapted to engage with said clamps whereby the ends of the belt are compressed within the clamps, and a filler block mounted on said means between said clamps laterally coextensive with the belt ends.

16. In combination, U-clamps, bolts for bolting the clamps to belt ends, overlapping ears mounted on said clamps, a pintle pin mounted thereon, a sleeve mounted around said pin between a pair of said ears, a resilient block enclosing said ears and said pin and located between said clamps extending laterally thereof.

17. In combination, U-clamps, bolts for bolting the clamps to belt ends, overlapping ears mounted on said clamps, a pintle pin mounted thereon, a sleeve mounted around said pin between a pair of said ears, a resilient block enclosing said ears and said pin and located between said clamps extending laterally thereof, a filler between the sleeve and said pintle pin.

18. In combination, U-clamps, bolts for bolting the clamps to belt ends, overlapping ears mounted on said clamps, a pintle pin mounted thereon, a sleeve mounted around said pin between a pair of said ears, a resilient block enclosing said ears and said pin and located between said clamps extending laterally thereof, a filler between the sleeve and said pintle pin of rawhide.

19. In combination, U-clamps, bolts for bolting the clamps to belt ends, overlapping ears mounted on said clamps, a pintle pin mounted thereon, a sleeve mounted around said pin between a pair of said ears, a resilient block enclosing said ears and said pin and located between said clamps extending laterally thereof, a filler between the sleeve and said pintle pin of rawhide, said resilient block being split, metallic fingers embodied in said split block, a clamping plate mounted thereon adapted to be retained in position by said fingers.

20. In combination, a V-belt having spaced ends, a hinge, clamps on said hinge clamping the free ends of said belt, vertical clamping bolts mounted in said clamps extending through said belt ends spaced laterally from the side walls of the belt, a bearing sleeve in said hinge and a filler block encircling said hinge laterally coextensive with said belt ends.

21. A new article of manufacture for use as a filler block in a belt connecter, comprising a bottom portion, end walls and top portions integral with said end walls, said bottom portion and top portions forming a chamber for receiving the pintle of a hinge.

22. A new article of manufacture for use as a filler block in a belt connecter, comprising a bottom portion, end walls and top portions integral with said end walls, said bottom portion and top portions forming a chamber for receiving the pintle of a hinge, and slots arranged in said block for receiving ears of a hinge carrying said pintle.

23. A new article of manufacture for use as a filler block in a belt connecter, comprising a bottom portion, end walls and top portions integral with said end walls, said bottom portion and top portions forming a chamber for receiving the pintle of a hinge, and slots arranged in said block for receiving ears of a hinge carrying said pintle, and clamping means for retaining said top portions in position comprising metallic fingers extending beneath said top portions and through them, and a clamping plate mounted thereon engaged by the free ends of said fingers.

24. A new article of manufacture for use as a filler block in a belt connecter, comprising a bottom portion, end walls and top portions integral with said end walls, said bottom portion and top portions forming a chamber for receiving the pintle of a hinge, and slots arranged in said block for receiving ears of a hinge carrying said pintle, and clamping means for retaining said top portions in position comprising metallic fingers extending beneath said top portions and through them, and a clamping plate mounted thereon engaged by the free ends of said fingers, said filler block being composed of rubber and fabric.

25. A fastener for the ends of a belt comprising two parts connected by a pivot pin with each other, each part having an upper and a lower plate, bolts screwed into the lower plate and a filling piece of rubber on said pivot pin with a cross section similar to that of the belt and adapted to fill the gap between the ends of the belt.

26. A fastener for the ends of a belt comprising two parts connected by a pivot pin with each other, each part having an upper and a lower plate, bolts screwed into the lower plate and a filling piece of rubber on said pivot pin with a cross section similar to that of the belt and adapted to fill the gap between the ends of the belt, the filling piece being formed in the same mould as the belt and vulcanized on the fastener.

In testimony whereof, I affix my signature.

RUDOLF RODERWALD.